United States Patent [19]

Hattori et al.

[11] Patent Number: 5,118,586
[45] Date of Patent: Jun. 2, 1992

[54] PHOTO-RECORDING MEDIA AND PHOTO-RECORDING METHOD

[75] Inventors: Yukari Hattori; Junichi Yoshitake; Tooru Yamanaka, all of Chiba, Japan

[73] Assignee: Mitsui Petrochemical Industries, Ltd., Tokyo, Japan

[21] Appl. No.: 325,995

[22] Filed: Mar. 20, 1989

[30] Foreign Application Priority Data

Mar. 28, 1988 [JP] Japan .................................. 63-75366
Mar. 28, 1988 [JP] Japan .................................. 63-75367
Jan. 6, 1989 [JP] Japan ........................................ 2-994

[51] Int. Cl.⁵ ......................... G03F 1/03; G03C 11/00
[52] U.S. Cl. ............................................ 430/20; 430/338; 430/345; 430/19; 252/299.01; 252/582; 252/586; 252/589
[58] Field of Search ................. 430/20, 338, 345, 19, 430/21; 252/299.01, 582, 586, 589

[56] References Cited

U.S. PATENT DOCUMENTS

| | | | |
|---|---|---|---|
| 3,212,898 | 10/1965 | Cerrata | 430/345 |
| 3,397,059 | 8/1968 | Dorion et al. | 430/345 X |
| 4,702,945 | 10/1987 | Etzbach et al. | 428/1 |
| 4,963,448 | 10/1990 | Ichimura et al. | 428/1 X |
| 5,024,784 | 6/1991 | Eich et al. | 428/1 X |

FOREIGN PATENT DOCUMENTS 62-2209186 9/1987 Japan .

Primary Examiner—Cynthia Hamilton
Attorney, Agent, or Firm—Nixon & Vanderhye

[57] ABSTRACT

In accordance with the present invention, there are provided photo-recording media comprising photochromic compounds having been dispersed or dissolved in stretched films or nematic liquid crystals, the transition moment of light absorption of said photochromic compounds being orientated in a definite direction. In the photo-recording media as provided, an information recorded in the photochromic compounds can be read out without destroying the same.

6 Claims, 3 Drawing Sheets

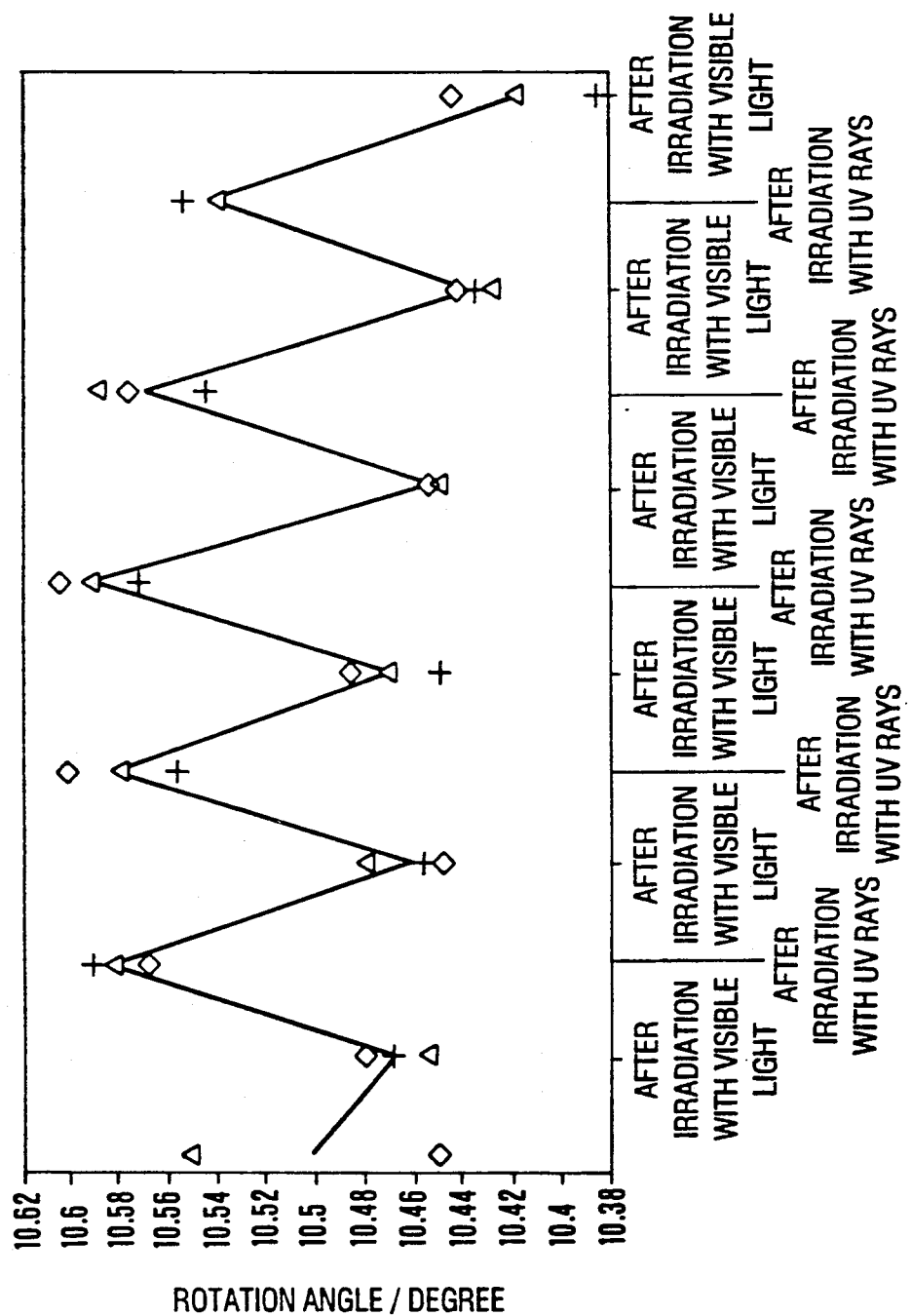

PHOTO-RECORDING MEDIA AND PHOTO-RECORDING METHOD

FIELD OF THE INVENTION

This invention relates to photo-recording media and photo-recording method, and more particularly to stable and highly sensitive photo-recording media containing photochromic compounds and photo-recording method using said photo-recording media.

BACKGROUND OF THE INVENTION

As rewritable photo-recording media, there have been proposed photo-recording media utilizing change in absorption spectrum before and after photoreaction of photochromic compounds. In the proposed photo-recording media, however, when recorded information is read out, the readout thereof must be carried out by means of light falling within the wavelength region at which the photochromic compounds absorb light. Accordingly, it follows that the light used in reading out such records is light for reading out the recorded information and, at the same time, is also light for erasing said recorded information. On that account, there was such a serious practical problem that to carry out reproduction of the information is essentially to destroy said information, and hence when the information recorded in the photochromic compounds is read out, said information is destroyed and no information can be read out again.

Japanese Patent L-O-P Publin. No. 209186/1987 in this connection discloses photomemory materials which are said to be those capable of inhibiting disappearance of memories recorded in photochromic compounds, said photomemory materials being prepared by dissolving or dispersing in solid substances having a cholesteric liquid crystal phase such photochromic compounds as capable of changing their molecular structure by irradiation with light different in wavelength. In this process, however, there is involved such a problem that a procedure for synthesizing the cholesteric liquid crystal which is a medium in which the dye is dissolved or dispersed is much complicated, because said cholesteric liquid crystal must have in the molecule asymmetric carbon atoms and also must be optically resolved.

OBJECT OF THE INVENTION

The present invention is to solve such problems as mentioned above, and it is an object of the invention to provide stable and highly sensitive photo-recording media containing photochromic compounds, said photo-recording media being capable of recording, reading and rewriting a desired information easily and stably, and a photo-recording method using said photo-recording media.

SUMMARY OF THE INVENTION

A photo-recording medium according to the present invention comprises a photochromic compound having been dispersed or dissolved in a stretched film or nematic liquid crystal or smectic liquid crystal, the transition moment of light absorption of said photochromic compound being orientated in a definite direction.

In the photo-recording media, an information is written in a photochromic compound with a structure change of the photochromic compound with a light beam irradiation, and a difference between apparent angles of rotation before and after the light beam irradiation is detected by means of light beam having the wavelength region at which said photochromic compound does not absorb light, thereby reading the recorded information.

BRIEF DESCRIPTION OF THE DRAWINGS

FIG. 3 is a graph showing a change in angle of rotation at the time when a photo-recording medium comprising a nematic liquid crystal having dissolved or dispersed therein a photochromic compound is irradiated alternately with ultraviolet rays and visible light.

DETAILED DESCRIPTION OF THE INVENTION

Figure 1:
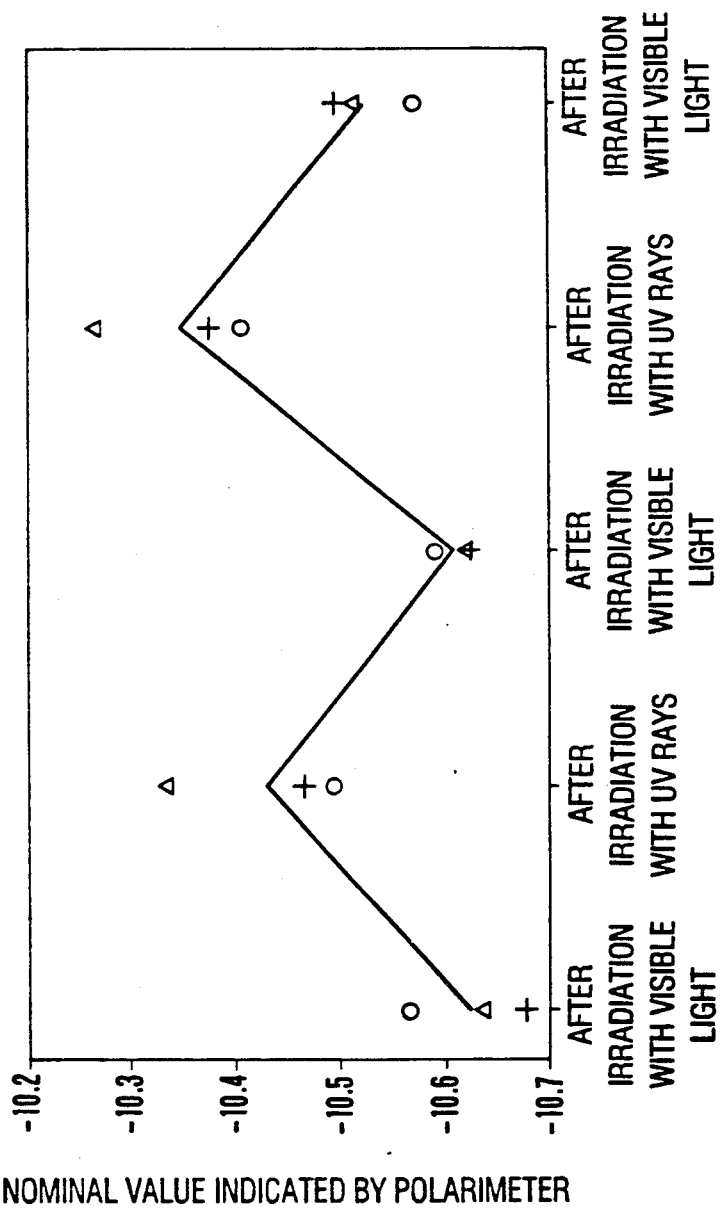
FIG. 1 is a graph showing a change in rotation angle on a place of polarization when a photo-recording medium comprising a stretched film having dispersed or dissolved therein a photochromic compound is irradiated alternately with ultraviolet rays and visible light.

The photo-recording media and photo-recording method using the same, to which the present invention relates, are illustrated in detail hereinafter.

In accordance with the present invention, photochromic compounds are used as photo-recording media, said photochromic compounds being dispersed in stretched films or dispersed in nematic liquid crystal or smectic liquid crystals, and the transition moment of light absorption of which being orientated in a definite direction. Generally, a compound, the transition moment of light absorption of which has been orientated in a definite direction, apparently exhibits optical activity in the absorption wavelength region and in the neighborhood thereof. Accordingly, when a photochromic compound, the transition moment of light absorption of which has been orientated in a definite direction, is used, an information can be written in the compound and the recorded information can be changed and, at the same time, its apparent angle of rotation can be changed by irradiating the compound with light of the absorption wavelength region at which the compound absorbs light. In this case, moreover, because the apparent angle of rotation is observed in the same manner as in the case of ordinary angle of rotation even in the wavelength region at which the photochromic compound does not absorb light, when the photochromic compound in which an information has been written is irradiated with light for reading of the wavelength region at which said photochromic compound does not absorb light and a change in angle of rotation is detected, the information recorded in said photochromic compound can be read out. If such procedure as mentioned above is adopted, the information written in the photochromic compound can be read out without destroying said written information.

Photochromic compounds used in the present invention are not always required to have optical activity in the molecule, as mentioned previously. Accordingly, all sorts of photochromic compounds may be used in the present invention, including spiropyran, fulgide, thioindigo, azobenzene and derivatives thereof.

Concrete examples of the photochromic compounds of the kind usable in the present invention include those as listed below.

1,3,3-Trimethylindolino-6'-nitrobenzospiropyran,
1,3,3-trimethylindolino-6'-nitro-8'-methoxybenzospiropyran,
1,3,3-trimethylindolino-6,8'-dibromobenzospiropyran,
1,3,3-trimethylindolino-5'-nitro-8'-methoxybenzospiropyran,
benzothiazolinospiropyran,
1,3,3-trimethylspiro[indolino-2,3-naphtho(2,1-b)(1,4)oxazine],
1,3,3-trimethyl-5-chlorospiro[indolino-2,3-naphtho(2,1-b)(1,4)oxazine],
1-(octyl)3,3-dimethylspiro[indolino-2,3-naphtho(2,1-b)(1,4)oxazine],
1-(tetradecyl)3,3-dimethylspiro[indolino-2,3-naphtho(2,1-b)(1,4)oxazine],
1,3,3-trimethylspiro[indolino-2,3-phenanthro-(9,10)(1,4)oxazine],
1,3,3-trimethyl-5-chlorospiro[indolino-2,3-phenanthro(9,10) (1,4)oxazine],
1,3,3-trimethylspiro[indolino-2,3-(3,6)disulfonaphtho(2,1-b) (1,4)oxazine]disodium,
2-butylidene(diphenylmethylene)succinic anhydride,
diphenylmethylene(isopropylidene)succinic anhydride,
2,5-dimethyl-3-furylethylidene(isopropylidene)succinic anhydride,
2,5-dimethyl-3-thiophenylethylidene(isopropylidene)-succinic anhydride,
thioindigo,
perinaphthothioindigo,
azobenzene,
4-methoxyazobenzene,
2-(2,4-dinitrobenzyl)pyridine, and
4,4',4''-tris(N,N-dimethylaminophenyl)methyl chloride.

In the present invention, the photochromic compound as exemplified above is dispersed in a stretched film or dispersed in a nematic liquid crystal smectic liquid crystal, thereby orientating the transition moment of light absorption of said compound in a definite direction.

The photo-recording media comprising a stretched film in which a photochromic compound has been dispersed is first illustrated. The stretched film itself used in the present invention has an apparent angle of rotation due to its double refraction and an apparent angle of rotation of the photochromic compound due to its absorption can be observed in the form of apparent angle of rotation which is added to the apparent angle of rotation of the stretched film itself.

Polymers used in the present invention to constitute such stretched film as mentioned above include amorphous polyolefin resins; polymethacrylic resins such as polymethyl methacrylate; polyacrylic resins such as polymethyl acrylate; polycarbonate resins; diallyl phthalate resins; polyester resins; polyether sulfone; polyethyl ketone; methylpentene polymers; polyarylate resins; polyethylene; polyolefins such as polypropylene and polybutene; polyphenylene sulfide; nylon; fluorine-contained resins; polyvinyl chloride; polystyrene; polyacrylonitrile; polyvinyl acetal; polyurethane; polyether; polyvinyl alcohol; polyvinyl acetate; polyvinyl ether; and cellulose derivatives.

Of these polymers, preferably used are polyolefins such as polyethylene and polypropylene, polyvinyl alcohol, polymethacrylic resins such as polymethyl methacrylate, polyester resins and amorphous polyolefin resins.

In order that the above-mentioned photochromic compound is dispersed in the stretched film and thereby to orientate a transition moment of light absorption of said photochromic compound in a definite direction, the following procedures may be adopted in concrete.

(1) A procedure wherein the polymer constituting the stretched film and the photochromic compound are dissolved in a solvent, the resulting solution is cast by the casting method into a film form, and the resulting film is then stretched.

(2) A procedure wherein the stretched film is prepared beforehand, and the stretched film thus prepared is impregnated with a solution of the photochromic compound followed by drying.

(3) A procedure wherein the polymer constituting the stretched film and the photochromic compound are kneaded together, and the kneadate obtained is molded into a film-like product, followed by stretching.

The stretched film used in the present invention is preferably stretched in the monoaxial direction, and the drawing ratio of the film, though it may vary depending on the kind of film, is generally desirable to be 1.2-10000 times, preferably 1.2-100 times and more preferably 2-50 times.

Next, the photo-recording media comprising the nematic or smectic liquid crystal in which the photochromic compound has been dissolved or dispersed is illustrated. The nematic or smectic liquid crystal used in the present invention includes p-alkyl-p'-alkoxyazoxybenzene, p-alkoxybenzylidene-p'-alkylaniline, p-alkylbenzylidene-p'-cyanoaniline, p-alkoxybenzylidene-p'-cyanoaniline, phenyl benzoate, p-alkyl-p'-cyanobiphenyl, p-cyano-phenylcyclohexane, cyclohexyl-cyclohexane, p-cyanophenylpyrimidine, 4-(4-alkylcyclohexyl)phenyl-4'-alkylbiphenylcarboxylate:

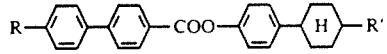

4-cyanophenyl-4-alkylbenzoate:

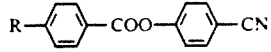

4-alkyl-4'-alkyloxymethylbiphenyl:

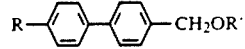

4-(4-alkylcyclohexyl)-1-cyclohexene carbonitrile:

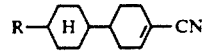

4-alkyloxymethylphenyl-4-alkylcyclohexane-1-carboxylate:

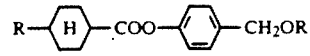

4-(5-alkyloxypentyl)phenyl-4-alkylcyclohexane-1-carboxylate:

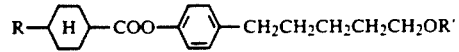

4-(4-alkylcyclohexyl)-4'-alkyloxymethylbiphenyl:

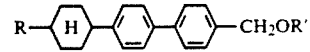

4-cyanophenyl-4-(4-alkyloxymethylphenyl)cyclohexane-1-carboxylate:

-continued

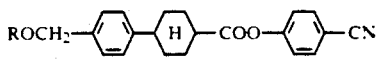

and 4-(4-alkyloxymethylcyclohexyl)-4'-(4-alkyloxymethyl-cyclohexyl)biphenyl:

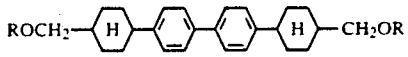

In the above exemplified alkyl represented R or alkoxy represented R' preferably from 1-15, in particular, 3-9 carbon atoms.

In order that the photochromic compound is dissolved in the nematic or smectic liquid crystal and thereby to orientate a transition moment of light absorption of said photochromic compound, the photochromic compound is dissolved or dispersed in the nematic liquid crystal, and the resulting nematic liquid crystal having dissolved or dispersed therein may be injected into a liquid crystal cell.

The amount of the above-mentioned photochromic compound dispersed or dissolved in the stretched film is preferably $1 \times 10^{-4}$–100 parts by weight, more preferably $1 \times 10^{-3}$–50 parts by weight based on 100 parts by weight of the stretched film, and that of the photochromic compound dissolved or dispersed in the nematic liquid crystal or smectic liquid crystal is preferaly $1 \times 10^{-4}$–100 parts by weight, more preferably $1 \times 10^{-3}$–50 parts by weight based on 100 parts by weight of the nematic liquid crystal.

In the present invention, moreover, a site urging the molecular orientation of photochromic compound may be introduced into the above-mentioned photochromic compound. If the molecule of the photochromic compound is so constituted in this manner, it becomes possible to effect orientation of the transition moment of light absorption of the thus introduced photochromic compound to a higher degree.

In the present invention, writing or rewriting an information in the above-mentioned photo-recording medium may be carried out in the following manner. That is, a desired spot of the photo-recording medium is irradiated with light beam of the absorption wavelength region of photochromic compound (A). By virtue of the above irradiation, in the spot irradiated with the light beam, a photochromic reaction takes place and the photochromic compound (A) will change reversibly to (B) different in structure. In contrast thereto, in the spot which is not irradiated with said light beam, such a change as above will not occur. In this manner, two states (A) and (B) may be arranged corresponding to the information in the photo-recording medium, and accordingly the information can be written in said medium. When the information once written in the photo-recording medium is intended to rewrite, the whole area to be rewritten is irradiated with light beam of the absorption wavelength region of (B) and thereby to convert all of the photochromic compound present in said area to (A) and to erase the information first recorded, and thereafter a new information may be written in said area.

In the present invention, readout of the recorded information may be carried out in the following manner. That is, the information written or rewritten in the above-mentioned manner is arranged in the photo-recording medium in order of (A) and (B). Because of (A) and (B) have their respective absorption spectra different from each other and also they are different in apparent angle of rotation, the change in angle of rotation can be used as a readout mode. Incidentally, because the apparent angle of rotation is also observed in the same manner as in ordinary angle of rotation even in the wavelength region at which the photochromic compound does not absorb light, the readout in the wavelength region at which both (A) and (B) do not absorb light becomes possible according to the present invention, differing from the case where the change in absorbance is used as the readout mode. Where the readout of records of information is carried out in the absorption wavelength region of either (A) or (B), said records are destroyed by the irradiation with light for reading. In the present invention, however, because the change in angle of rotation is used as the readout mode, the information recorded in the photochromic compound can be read out without destroying the same.

The present invention is illustrated below in more detail with reference to examples, but the invention is in no way limited to those examples.

EXAMPLE 1

To 27.5 ml of distilled water was added 2.5 g of polyvinyl alcohol (a product for spectrophotometry, produced by Wako Junyaku K. K.), and the mixture was kept at 60° C. and stirred for several hours at that temperature. The resulting paste-like solution of polyvinyl alcohol was charged with 10 ml of $10^{-4}$M ethanol solution of 1,3,3-trimethylindolino-6'nitrobenzospiropyran (hereinafter called spiropyran), and the solution was stirred until it became homogeneous. After the completion of the stirring, the solution was allowed to stand until air bubbles caused by stirring disappeared, and the solution was casted into a porcelain vat. The vat was allowed to stand at room temperature for about 1 week, the film formed was withdrawn therefrom, cut into an appropriate size and then stretched to 1.4 times while applying heat thereto.

While grinding about photochromic reaction by irradiation of this film (film thickness 500 μm) alternately with UV rays (300–400 nm) and visible light (400 nm to long wavelengths), a rotation angle on a plane of polarization before and after the reaction was measured with a polarimeter, whereby such reversible changes as shown in FIG. 1 occurred. The above-mentioned measurement was conducted at a wavelength of 589.3 nm where no practical absorption of spiropyran was observed. The foregoing indicated that in the photo-recording medium, the information recorded can be rewritten and also the information written or rewritten can be read out without destroying the same.

EXAMPLE 2

Example 1 was repeated except that a film (film thickness 300 μm) of polyvinyl alcohol prepared by the addition of 10 ml of ethanol was immersed at room temperature for about 20 minutes in an ethanol solution of furylfulgide (represented by the following structural formula 1), withdrawn therefrom, air dried, vacuum dried and then stretched to 2.4 times while applying heat. Thereafter, a rotation angle on a plane of polarization was measured before and after the reaction of furylfulgide by irradiation with UV rays and visible light in the same manner as in Example 1. As the result, it was found that at the time when a colorless body of fulgide changes to a colored body thereof, the rotation angle changes by +0.5° at 650 nm and 0.05° even at 700 nm. The absorption end of the colored body of fulgide is in the vicinity of 600 nm, and thus it was indicated that even in this system of photochromic compound, a non-destructive readout can be carried out.

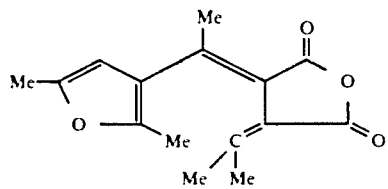

Structural formula 1

EXAMPLE 3

A solution of 5.5 g of polymethyl methacrylate in 30 ml of acetone was stirred, charged with 10 ml of $10^{-4}M$ acetone solution of furylfulgide, allowed to stand until air bubbles caused by stirring disappeared and then casted in a porcelain vat. The vat was allowed to stand at room temperature for 1 week in a dark room. The film formed was withdrawn therefrom, cut into an appropriate size, and stretched to 1.6 times (film thickness 100 μm). In the same manner as in Examples 1 and 2, a rotation angle on a plane of polarization before and after the reaction of furylfulgide by irradiation with UV rays and visible light was measured. As the result, the rotation angle on the plane of polarization decreased by 0.06° with ring closure of furylfulgide by UV irradiation, and when furylfulgide underwent ring opening again by irradiation with visible light, the decreased rotation angle on the plane of polarization returned to its original level.

EXAMPLE 4

A stretched polyethylene film (film thickness 100 μm) was immersed in a toluene solution of furylfulgide (structural formula 1), kept at about 80° C. for 2 hours, and withdrawn therefrom, followed by air drying. In the same manner as in Example 1, a rotation angle on a plane of polarization before and after the reaction of furylfulgide by irradiation with UV rays and visible light was measured. As the result, the rotation angle on the plane of polarization increased by 0.02° with change in structure from colorless body to colored body by UV irradiation, and the increased rotation angle returned to its original level by irradiation with visible light. This change was detected and confirmed by repeating the above operation more than 10 times.

EXAMPLE 5

In 0.3 ml of a room temperature nematic liquid crystal (ZLI 1132 a product of Merck Co.) was dissolved 6 mg of furylfulgide (represented by the following structural formula 1), and the solution was injected into a parallel orientation type liquid crystal cell to form a photo-recording medium. The photo-recording medium was kept at 35° C. and irradiated with light of the absorption wavelength of furylfulgide to measure a change in dispersion of rotation angle.

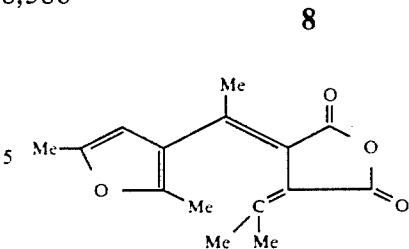

Structural formula 1

Figure 2:
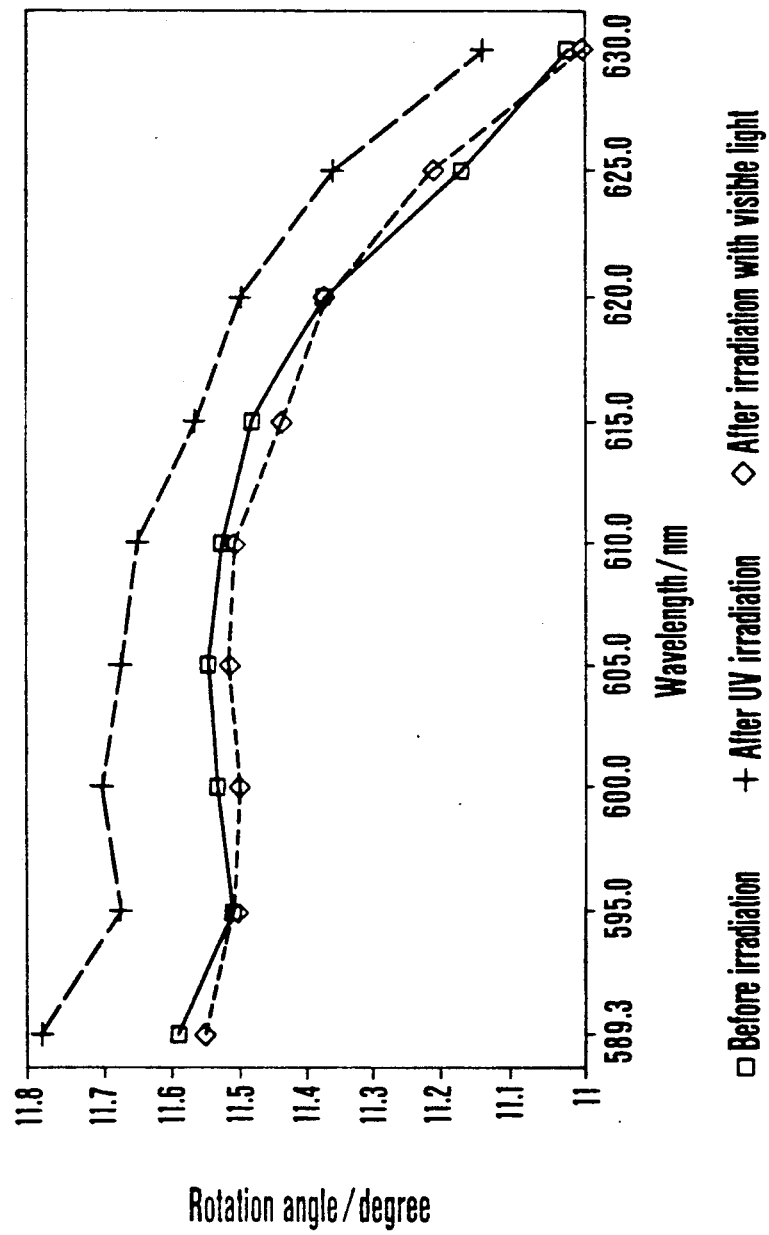
FIG. 2 is a graph showing a change in angle of rotation at the time when an information recorded in a photo-recording medium comprising a nematic liquid crystal having dissolved or dispersed therein a photochromic compound by irradiation with ultraviolet rays is read out by using visible light.

The results obtained are shown in FIG. 2.

When the photo-recording medium of this example is irradiated with UV rays (300-400 nm), furylfulgide changes from a ring opening form to a ring closing form, and in that case, photochromic reaction is brought about and a change in dispersion of the rotation angle.

This rotation angle dispersion takes place over a wide wavelength range and can be read out even by light having a wavelength longer than 600 nm at which no absorption of furylfulgide is observed.

Subsequently, furylfulgide was irradiated with visible light (400 nm to longer wavelength), whereupon the rotation angle dispersion returned to its original state. Furthermore, while observing a change in rotation angle by irradiating the photo-recording medium with light of 600 nm at which no practical absorption of a ring opening form and a ring closing form of furylfulgide is observed, said photo-recording medium was irradiated alternately with UV rays and visible light (400 nm to longer wavelength), whereupon such reversible changes in rotation angle as shown in FIG. 3 were observed. From the foregoing, it was indicated that an information can be rewritten and a non-destructive readout can be made according to the photo-recording method of the present invention. Further, the liquid crystal was transformed into an isotropic phase by raising the temperature, whereupon optical activity of the liquid crystal was lost. This narrates that in the photo-recording medium, the orientation of the photochromic compound is an essential factor of the development of optical activity.

EXAMPLE 6

In a ferroelectric liquid crystal (represented by the structural formula 2 mentioned below) was dissolved 0.01 mole, based on one mole of the above-mentioned liquid crystal, of the photochromic compound used in Example 5, and the solution was injected into a parallel orientation type liquid crystal cell to form a photo-recording medium.

Structural Formula 2

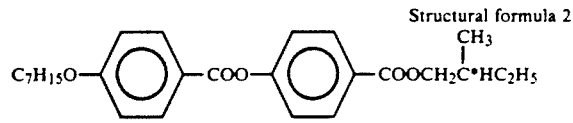

Structural formula 2

The same light irradiation as in Example 5 was effected, whereupon a rotation angle at 600 nm changed by +0.2° by UV irradiation, and the rotation angle returned to its original level by irradiation with visible light. Furthermore, the liquid crystal was transformed into an isotropic phase by raising the temperature, whereupon optical activity was lost.

What is claimed is:

1. A photo-recording medium comprising a photochromic compound having been dispersed or dissolved in a stretched film or nematic liquid crystal or smectic liquid crystal, the transition moment of light absorption of said photochromic compound being orientated in a definite direction.

2. The photo-recording medium as claimed in claim 1 wherein the stretched film is a monoaxially stretched film.

3. The photo-recording medium as claimed in claim 1 wherein the stretched film is a stretched film of polyolefin, polyvinyl alcohol, polymethacrylate, polyester or amorphous polyolefin resin.

4. A photo-recording method which comprises irradiating a photo-recording medium comprising a photochromic compound having been dispersed or dissolved in a stretched film or nematic liquid crystal or smectic liquid crystal, the transition moment of light absorption of said photochromic compound being orientated in a definite direction, with light beam of the absorption wavelength region of said photochromic compound to change the photochromic compound in structure, thereby writing or rewriting an information, and irradiating the photo-recording medium with light beam of a wavelength region, at which no absorption of said photochromic compound is observed, as a readout light, thereby detecting a difference in apparent rotation angle before and after the light irradiation and writing and reading the information in a non-destructive manner.

5. The photo-recording method as claimed in claim 4 wherein the stretched film is a monoaxially stretched film.

6. The photo-recording method as claimed in claim 4 wherein the stretched film is a stretched film of polyolefin, polyvinyl alcohol, polymethacrylate, polyester or amorphous polyolefin resin.

* * * * *